(12) United States Patent
Orye et al.

(10) Patent No.: US 7,858,900 B2
(45) Date of Patent: Dec. 28, 2010

(54) LASER WELDING PROCESS

(75) Inventors: Hans Christian Orye, Soenderborg (DK); Torben Funder-Kristensen, Soenderborg (DK); Christian Eggert Mortensen, Soenderborg (DK); Anders Vestergaard, Sydals (DK); Jia He, Beijing (CN)

(73) Assignee: Danfoss A/S, Nordborg (DK)

( * ) Notice: Subject to any disclaimer, the term of this patent is extended or adjusted under 35 U.S.C. 154(b) by 733 days.

(21) Appl. No.: 11/813,006

(22) PCT Filed: Dec. 22, 2005

(86) PCT No.: PCT/DK2005/000821

§ 371 (c)(1),
(2), (4) Date: Oct. 25, 2007

(87) PCT Pub. No.: WO2006/069576

PCT Pub. Date: Jul. 6, 2006

(65) Prior Publication Data

US 2009/0001060 A1     Jan. 1, 2009

(30) Foreign Application Priority Data

Dec. 30, 2004    (DK)  ............................... 2004 02033

(51) Int. Cl.
    *B23K 26/20*      (2006.01)
    *B23K 26/32*      (2006.01)
    *F16K 27/10*      (2006.01)
(52) U.S. Cl. ............................ 219/121.64; 219/121.77; 219/121.82; 228/140; 285/288.1; 285/291.1; 285/329

(58) Field of Classification Search ............. 219/121.64, 219/121.82; 228/140; 285/285.1, 288.1, 285/288.2, 291.1, 422
See application file for complete search history.

(56) References Cited

U.S. PATENT DOCUMENTS

| | | | | |
|---|---|---|---|---|
| 3,415,546 | A | * 12/1968 | Rubner et al. | ........... 285/148.12 |
| RE30,989 | E | * 7/1982 | Bake et al. | ................ 251/335.2 |
| 4,506,432 | A | * 3/1985 | Smith | ........................... 29/458 |
| 4,577,088 | A | 3/1986 | Sharp | |
| 4,738,388 | A | * 4/1988 | Bienek et al. | ................ 228/135 |
| 5,760,365 | A | 6/1998 | Milewski et al. | |
| 6,710,282 | B2 | * 3/2004 | Sonoda et al. | .......... 219/121.63 |

FOREIGN PATENT DOCUMENTS

| | | |
|---|---|---|
| EP | 0916443 A1 | 5/1999 |
| EP | 1035259 A1 | 9/2000 |
| EP | 1331058 | 7/2003 |
| FR | 2836080 | 8/2003 |
| JP | 2002336983 A * | 11/2003 |

* cited by examiner

*Primary Examiner*—Samuel M Heinrich
(74) *Attorney, Agent, or Firm*—McCormick, Paulding & Huber LLP

(57) ABSTRACT

The invention provides a method of making a component from first and second parts which are joined in a welding process wherein a laser beam is transmitted in a direction from a laser source and at least partly into a gap. The gap is made between edges of the component, and to enable a faster laser welding process, the laser has a focus point size which is at least of the size of the gap. To enable better control of the width of the gap, the invention further provides a method and components wherein one part is formed with a neck which extends into a complementary socket of the other part to prepare the parts for the welding process. The invention in particular concerns welding of brass.

23 Claims, 5 Drawing Sheets

LASER WELDING PROCESS

CROSS REFERENCE TO RELATED APPLICATIONS

This application is entitled to the benefit of and incorporates by reference essential subject matter disclosed in International Patent Application No. PCT/DK2005/000821 filed on Dec. 22, 2005; and Danish Patent Application No. PA 2004 02033 filed Dec. 30, 2004.

FIELD OF THE INVENTION

The invention relates to a method of making components by laser welding. The components are made from first and second parts, wherein at least one of the parts is made from an alloy which contains metal with a boiling point which is in the range of, or lower than the melting point of the alloy. The parts are joined in a welding process wherein a laser beam is transmitted in a direction from a laser source and at least partly into a gap between first and second edges of the parts. Vapours of metal which boil during the welding process are conducted away from the component via the gap. The invention further relates to a valve made from two components by laser welding. The invention further relates to two components for making a valve.

BACKGROUND OF THE INVENTION

The laser welding process has been developed as one out of many ways of joining metal parts. In welding processes in general, heat, pressure, or both it applied to melt a part of the metal and thereby to join the parts when the molten metal solidifies. The process can be carried out with or without filler material to produce a localized union through fusion or re-crystallization across the interface. The quality of a weld seam is largely governed by the weld joint penetration in a weld gap and by the homogeneity of the interface, e.g. the number of pores. The weld joint penetration depends on the temperature in the melt which again depends on the volume of the melt and thereby on the size of the gap between the parts which are joined. The pores derive from gases which are confined during the crystallization, and these pores, depending upon their number, size and location in the interface, can lead to cracks or prevent good adherence of a surface coating.

High energy density welding methods such as electron beam welding and laser welding have been used to achieve high depth to width ratios. In the laser welding process, the heat is generated by a concentrated coherent light beam which is focused on a very small spot. Often, the reflectivity is high. One problem related to the reflectivity is that the reflected beam may damage the optics or other parts of the laser welding equipment. Another problem is that the reflection prevents sufficient deposition of energy to melt the metal. In one attempt to solve the problem, e.g. as suggested in U.S. Pat. No. 5,760,365, the welding joint is prepared with a gap of one to several millimeters, and the welding variables are adjusted by use of a model of the laser beam and the geometry of the joint. The light beam reflects back and forth between walls of the gap which results in an increased localised heating of the metal. One problem, however, is that the gap increases the amount of metal which must be melted and thus decreases the speed at which laser can be advanced in the gap. If the laser beam energy is increased to solve this problem, a result will typically be an excessive heat input. If the welding gap is narrowed, the speed may be increased, but in that case, the laser beam must be positioned precisely over the gap, and if the gap is too narrow, the above mentioned problem with reflection of the laser light recurs.

As aforementioned, the size of the gap is important to obtain a reliable welding quality. The size of the gap is governed by the position of one part relative to the other, and in practice, it is often difficult to locate the parts precisely.

SUMMARY OF THE INVENTION

It is an object of the invention to improve welding, in particular welding in components made from alloys such as brass, e.g. for making welded valve components. Accordingly, the invention provides a method of making a component from first and second parts characterised in that the laser beam is focused to form a focus point having a size in the range of, or larger than a distance between the edges which are welded, e.g. the distance at an outer surface of the parts, i.e. the focus point is larger than the gap between the parts at the outer surface of the parts.

Due to the size of the focus point, the light may at one time be caught by the gap in which a first part of the light is reflected back and fourth between the edges, and a second part of the light may heat a transition zone between the edges and an outer surface of the component whereby the welding speed can be increased.

The method could be applied for joining first and second axial edges (e.g. terminal end surfaces) of first and second tubular components e.g. for joining pipes, fittings, or for assembling valves.

The first part could be formed with one or more axial protrusions extending in a longitudinal direction from the first one of the axial edges. The axial protrusion could form a cylindrical extension with a diameter which is smaller than the remaining portion of the first part, or it could comprise several oblong elements protruding axially from the first edge. The axial protrusions are from now referred to as a neck of the first part. The neck could be received in a complementary opening, recess or hollowing out which in the following is referred to as a socket, in the second part. The socket may extend from the second edge and in the longitudinal direction into the second part. When the parts are joined via the neck and socket, the first and second edges which are to be welded should be located adjacently at a distance thereby forming the gap. Due to the forming of the neck and socket, the distance between the parts, and thereby the size of the gap can be adjusted in a simple and reliable manner by moving the neck back and forth in the socket in the longitudinal direction. When the gap is adjusted, the parts can remain in this position relative to each other while they are welded by projection of a laser beam in a light beam direction from a laser source and at least partly into the gap without the use of external fixation means. As a result, the quality and the speed of the welding process can be increased. As a further improvement, the neck which is inserted into the socket may form backing for the welding and thus prevent that the molten material flows through the welding joint and into an inner space or conduit of the tubular components.

The neck and socket may preferably join the first and second part in a friction joint, i.e. so that the neck is movable within the socket but wherein the movement of one of the parts is hindered by friction between an outer surface of the neck and an inner surface of the socket. Alternatively, the neck and socket may form a screw joint or the inner surface of the socket and outer surface of the neck may have cooperating protrusions hindering the movement of one part relative to the other part. Alternatively, one of the neck and socket comprises a protrusion which is received in a depression of the other one of the neck and socket whereby the two parts can be moved towards each other until the protrusion is received in the depression at which position the gap between the first and second edge is correct.

According to the invention, the focus point is larger than the gap. In this respect, focus point is the point onto which collimated light parallel to the axis is focused. Although the focus is conceptually a point, physically, the focus has a spatial extent which according to the invention is larger than the gap, i.e. the diameter of the spot is larger than the width of the gap or, if the spot is not circular, at least a dimension of the spot perpendicular to the direction of movement of the spot is larger than the width of the gap.

In one embodiment of the invention, two laser beams are projected into the gap. In this case, at least one of the beams should have a larger focus point than the width of the gap. Alternatively, the two spots are located adjacently on a line which is transverse, e.g. perpendicularly transverse to the process direction of the welding. In this case, each of the spots individually may be smaller than the gap, but the dimension of the light spot which results from the two spots in a direction perpendicular to the process direction should exceed the width of the gap.

To improve the welding quality and speed, the edges may for example form an angle of between 0 degrees and 20 degrees with the laser beam, and the parts may be oriented in relation to the laser source so that the outer surfaces of the parts are essentially perpendicular to the laser beam or so that the outer surface forms an angle between 70 degrees and 90 degrees to the laser beam. The focus point of the laser light could be located essentially at the height of the outer surface of the parts, or slightly above or below the outer surfaces. It may be an advantage to position the elements relative to each other so that the gap is of the size of, or slightly smaller than the focus point.

The method may advantageously be applied for welding a component made from an alloy which contains metal with a boiling point which is in the range of, or lower than the melting point of the alloy. In particular, the invention may be applied to joining components wherein at least one of the components is made from an alloy containing a metal with a boiling point which, measured in degrees Celsius, is lower than 99.5 pct of the melting point of the alloy.

Brass is an example of such an alloy, wherein zinc evaporates at a boiling temperature of 907 degrees Celsius whereas the melting point of brass varies approximately within the range of 916-1010 degrees Celsius depending on the type of brass alloy. The components could be made from brass, e.g. containing 30-50 pct zinc and optionally other metals such as tin. Examples of various known types of brass are Admiralty brass containing 30% zinc and 1% tin, Alpha brasses, with less than 35% zinc, Alpha-beta brass, also called duplex brass, is 35-45% zinc, and others.

When the metal evaporates, the gas can be confined in the melt where it causes welding pores and reduces the strength of the welding. Furthermore, the evaporating metal may cause sputtering of the melt and the surface of the welded component may become rugged. To reduce or to avoid these drawbacks, the gap could be provided to allow at least a portion of the gas to defuse from the gap and into the surrounding atmosphere. For that purpose, the gap may preferably be open in the light beam direction outwardly, i.e. the gap may preferably form an opening in the outer surface of the component, and the opening may preferably be at least of the same width or smaller than the size of the laser focal point. A gap with a width in the range of 0.05-0.3 mm has been found suitable for the welding purpose, and a laser with a focus point size of at least 0.15 mm such as at least 0.5 mm or at least 0.8 mm could preferably be selected. To further improve the draining of the gases away from the melt, a passage may be provided in the bottom portion of the welding gap, i.e. opposite the outer surfaces, to conduct the gasses into the inner conduit of the tubular parts.

In a second aspect, the invention provides a component made from parts which are prepared to be joined by a welding process, the component comprising first and second parts, at least one of which are made from an alloy which contains metal with a boiling point which is in the range of, or lower than the melting point of the alloy. All considerations concerning the type of alloy mentioned with respect to the first aspect applies equally to the second aspect. The parts may be joined in a joint zone wherein the first part comprises a neck which is formed to be inserted in a longitudinal direction into a complementary socket in the second part whereby first and second edges of the first and second parts, respectively, are located adjacently at a distance thereby forming a gap to be filled with a melt during the welding process. According to the invention the gap forms an opening in an outer surface of the component so that at least a part of a laser beam may be directed from outside the component and into the gap as part of the welding process.

The neck and socket may comprise abutting surfaces which are circular in a view cross-sectional to the longitudinal direction, and the parts may, as aforementioned be joined in a friction joint, in a screw joint or in similar ways. In particular, the screw joint may comprise screw threads with a pitch designed to make the preparation of the component for the welding process easy. As an example, the parts may firstly be joined until the edges abut each other, and the pitch of the threads may provide the correct gap based on a specific number of turns of one part relative to the other part. Subsequently, during the welding process, the screw joint may ensure that a minimum distance between the edges remains regardless of potential heat affected deformation of the parts.

To further ensure the distance, one of the edges may comprise one or more protrusions extending in the longitudinal direction towards the other edge and thereby preventing the two edges from getting closer to each other than the height of the protrusions.

The component may preferably comprise a tubular body made from tubular parts forming an inner cavity, and a passage extending from the cavity towards the gap may be formed to further facilitate draining of gas out of the melt during the welding. The component could e.g. be a valve for controlling a fluid flow.

Depending upon the distance between the parts, it may be necessary to use a filler material which is melted during the welding and which thus forms part of the melt. For that purpose, at least one of the parts may comprise a circumferentially extending protrusion extending essentially perpendicularly to the longitudinal direction and being provided to be melted at least partly during the welding process. In particular, one outer surface of the protrusion may form part of the edge of that part and the volume of the protrusion may correspond essentially to the volume of the gap. In one embodiment, both parts are provided with a protrusion to be melted away and thus to form part of the melt during the welding process. The protrusion, or the protrusions may have a total volume which constitutes at least 100 pct and preferably in the order of 130 pct of the volume of the gap between the surfaces. If a outwardly extending bead is desired, the total volume of the protrusion may constitute in the range of 130-500 pct.

In a third aspect, the invention provides a method of making a component from first and second parts which are joined in a welding process wherein a laser beam is transmitted in a direction from a laser source and at least partly into a gap between first and second edges of the parts, characterised in that the first part is formed with a neck extending in a longitudinal direction from the first edge into a complementary socket which extends from the second edge into the second part whereby the first and second edges are located adjacently at a distance thereby forming the gap.

Any of the aspects mentioned in connection with the first aspect of the invention may also apply for the second and third aspects.

BRIEF DESCRIPTION OF THE DRAWINGS

In the following, a preferred embodiment of the invention will be described in further details with reference to the drawings in which.

DETAILED DESCRIPTION OF THE INVENTION

Figure 1:
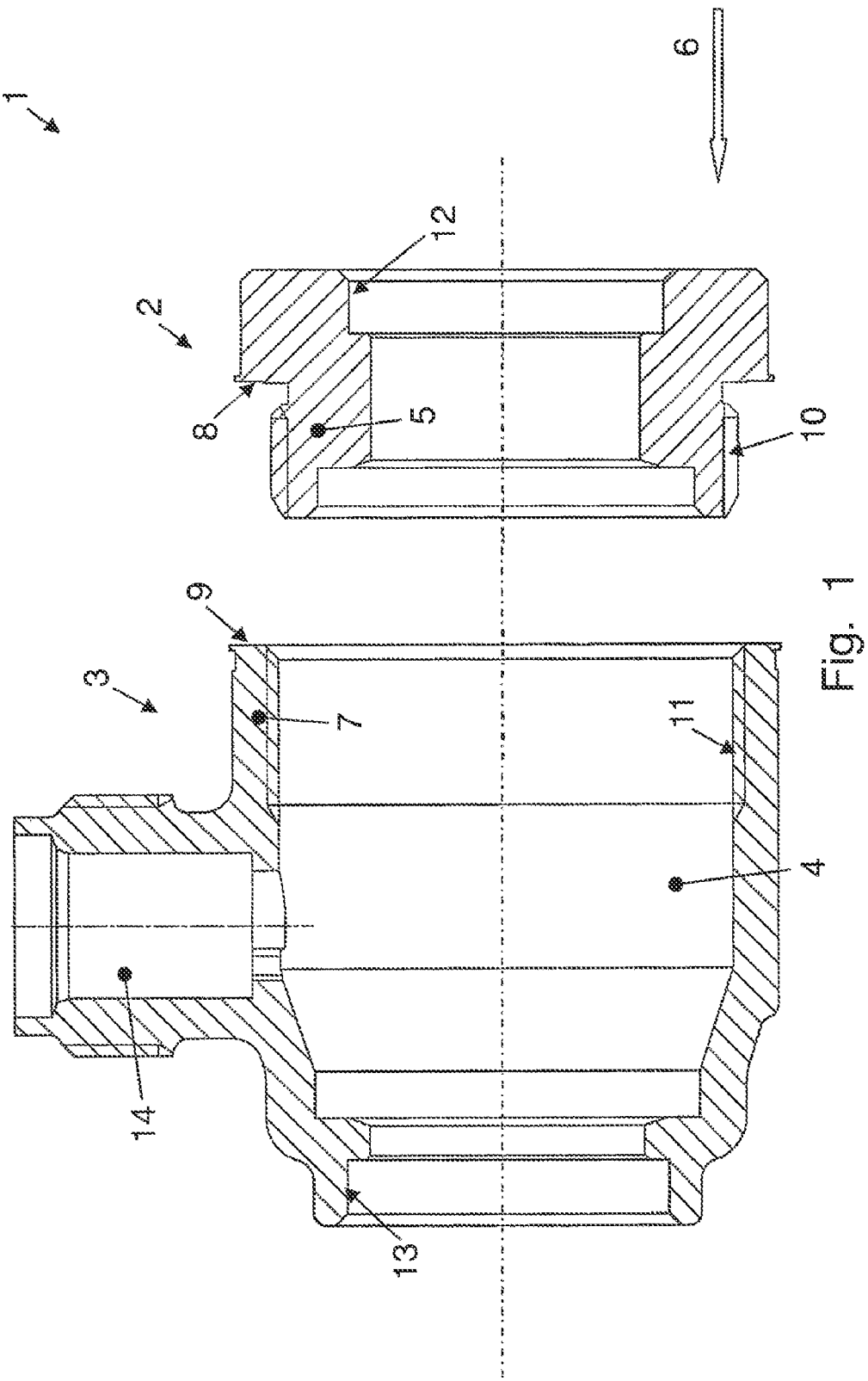
FIG. 1 shows a cross sectional view of a first part and a second part, disassembled.
Figure 2:
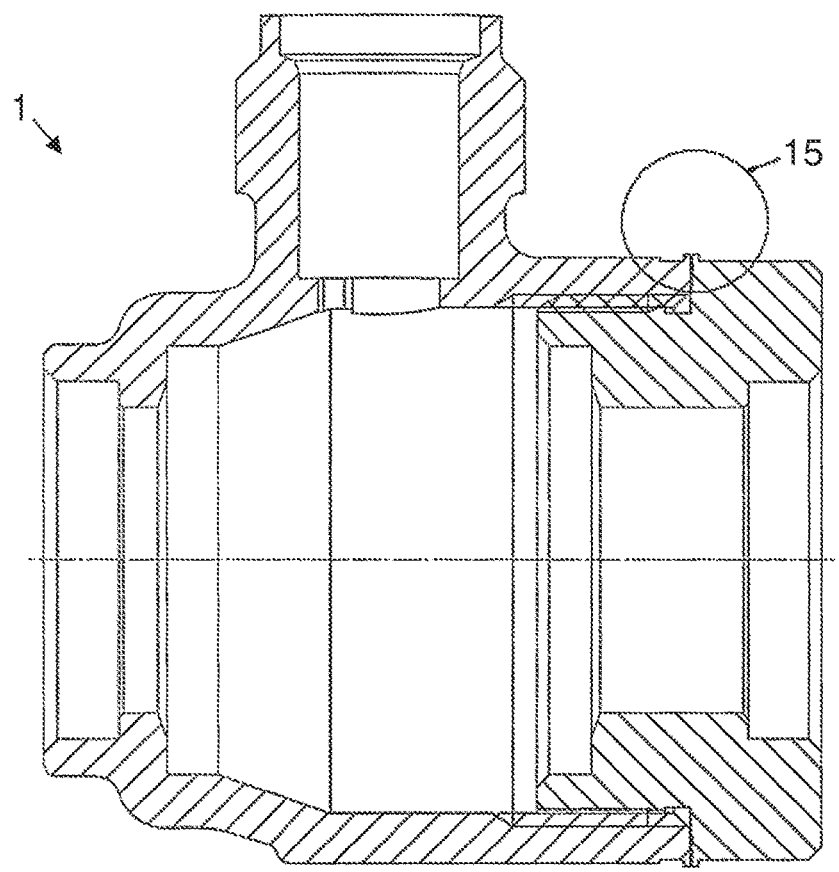
FIG. 2 shows a cross sectional view of a valve made from a the first and second parts.

Referring to FIG. 1, the component 1 is a housing for a valve for controlling a fluid flow. The component is made from a first part 2 and a second part 3 which are prepared to be joined by a welding process. The parts are tubular and form an inner cavity 4. The first part comprises a neck portion 5, which is formed to be inserted in a longitudinal direction, symbolised by the arrow 6 into a complementary socket 7 in the second part. The first part comprises a first edge 8 and the second part comprises a second edge 9. When the neck portion is inserted into the socket, the edges are located adjacent each other with a distance forming a gap between the parts. The distance is shown in FIG. 2 wherein the parts are assembled. A threaded portion 10, 11 is provided for joining the parts preliminary for keeping a fixed mutual position of the parts during welding. When the parts are assembled, they form a valve component with joint sections 12, 13 for soldering the valve into a fluid flow system, and with control means operable through the control gate 14.

Figure 3:
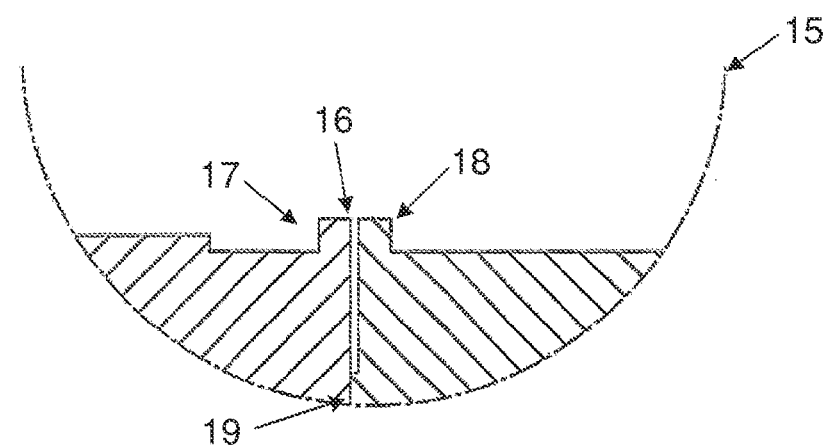
FIG. 3 shows an enlarged view of the welding zone in FIG. 2 prior to the welding.

FIG. 2 shows a cross-sectional view of the assembled valve before the parts are welded. FIG. 3 shows an enlarged view of the encircled portion 15 in which the surfaces 8, 9, c.f. FIG. 1 and the gap 16 between the surfaces is more clearly seen. During laser welding, the laser light beam may extend from the laser source into the gap. During the welding process, the gap is filled with melt, and for that purpose, filler material is conducted from the protrusions 17, 18 which is at least partly melted away during the welding process.

Figure 8:
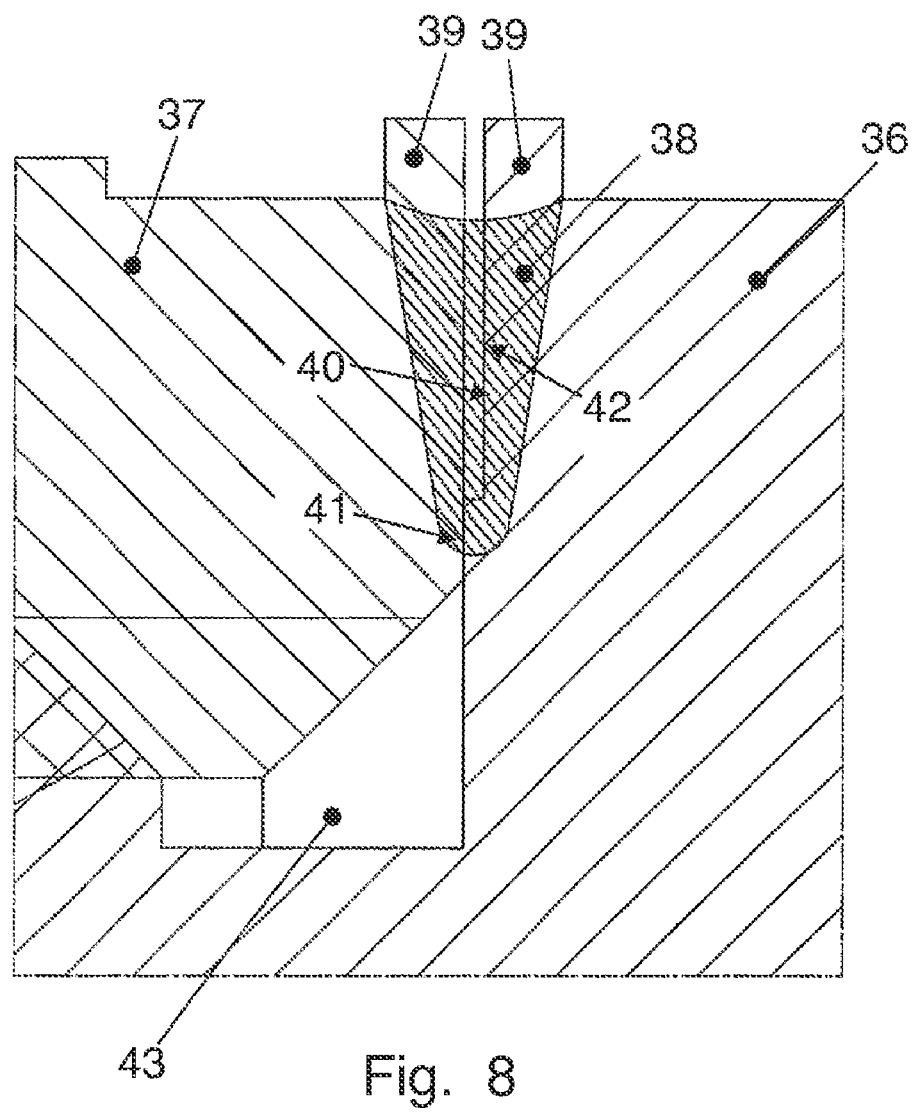

The protrusion 19 formed on the first part extends circumferentially on one of the surfaces 8, 9 and serves to secure a minimum size of the gap. The geometry corresponds to the geometry shown in FIG. 8. The protrusion is located relatively low in the joint and blocks passage between the gap 16 and the buffer chamber 43, c.f. FIG. 8.

Figure 4:
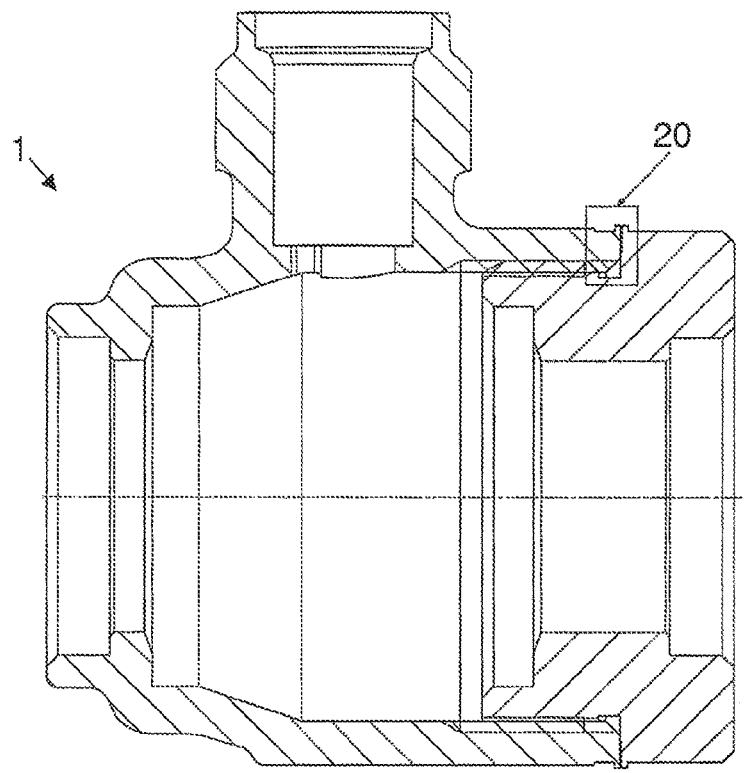
FIGS. 4 and 5 show alternative geometries of the gap.
Figure 5:
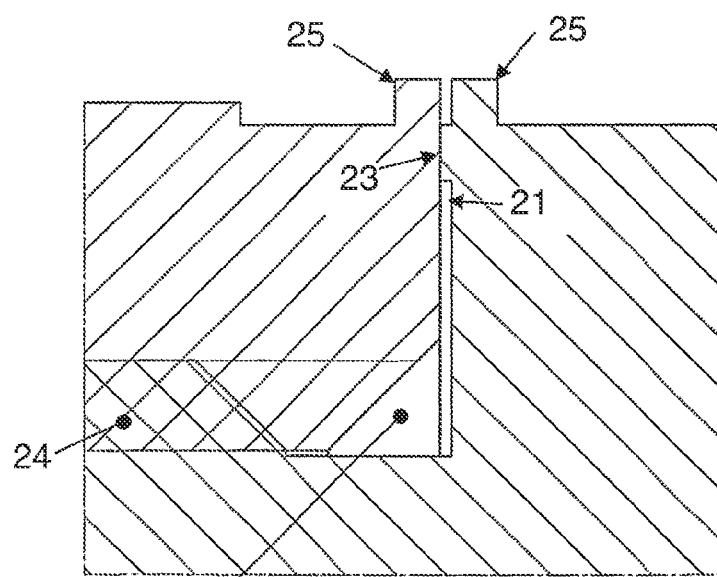

FIGS. 4 and 5 show an alternative embodiment of the valve. FIG. 5 shows an enlarged view of an alternative embodiment of the section 20 in FIG. 4. The shape of the parts forms a gap 21 and a buffer chamber 22. The gap is maintained by a protrusion 23 of one of the surfaces, and the parts are interlocked by a screw joint indicated by the double hatched area 24. The parts comprise protrusions 25 extending circumferentially along the outer surface of the part and being provided to be melted at least partly during the welding process thereby to fill the gap 21. Compared with the joint geometry disclosed in FIGS. 3 and 5, the protrusion 23 is located relatively higher in the groove whereby the pool of melted material penetrates the protrusion during the welding and thereby creates a passage from the gap into the buffer chamber 22 into which welding gasses can be conducted.

An example of the preparation and welding of a valve component will now be described in details with reference to the remaining FIGS. 6-10. The parts are prepared from a brass alloy, e.g. made of the following metals by weight:

copper 58.0%
zinc 38.59
lead 2.72%
tin 0.3%
iron 0.28%
nickel 0.09%
aluminum 0.017%

However, brass alloys with other proportions may give acceptable results.

The parts to be welded are prepared according to the invention, i.e. one part with a socket and one part with a neck, the neck and socket comprising cooperating threads. The parts are brought together and then screwed into each other, making use of their corresponding threaded sections, and preserving a gap between the assembled parts. The design of the parts is such that this gap is at a fixed size corresponding to the size of the spot of the laser.

In this preferred embodiment the gap could be between 1.5 and 2.0 mm deep and have a width of between 0.1 and 0.15 mm. Correspondingly, the protrusions which are adapted to be melted during the welding process may preferably have a height of 0.4 mm and a width of 0.4 mm.

The screwing together of the separate parts of the parts to be welded also facilitates the fixing of the parts relative to each other so that no movement between them occurs during the welding process.

The assembled parts are mounted with their common axis vertical in a jig constructed in a manner which enables them to be rotated around their common axis.

Figure 6:
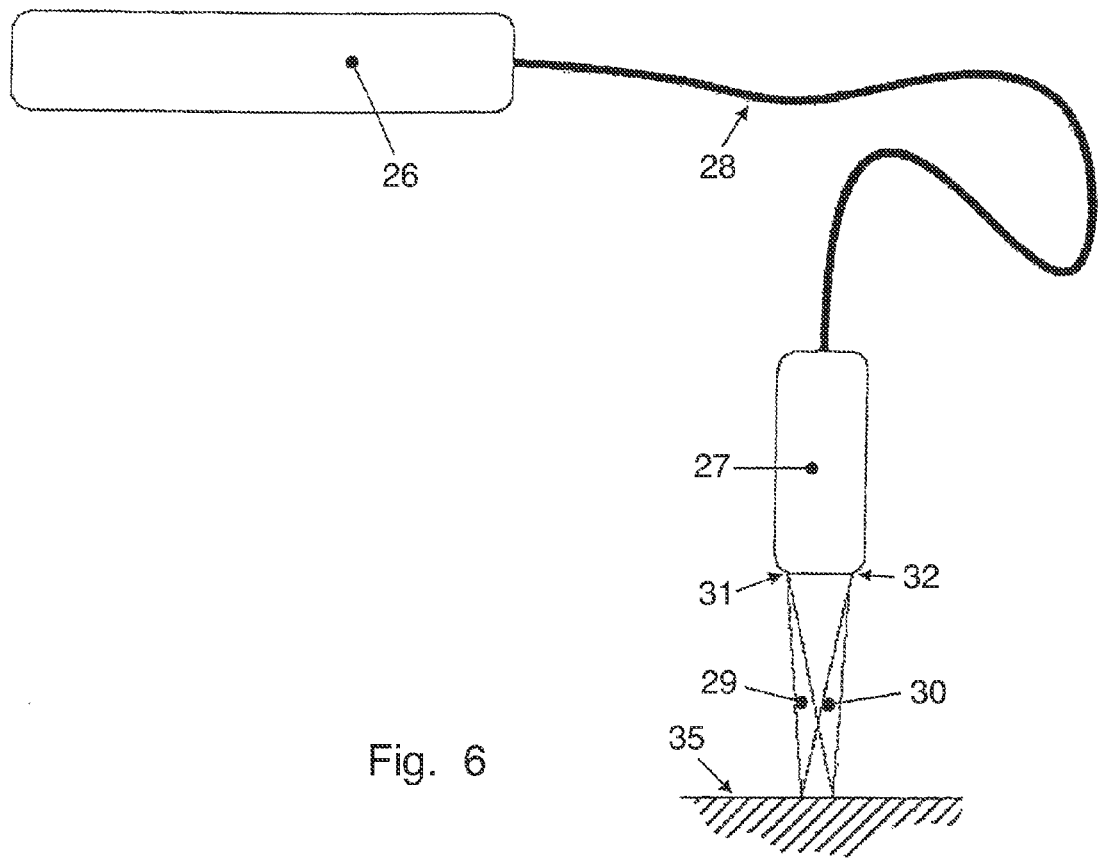
FIGS. 6-8 show details of welding performed on a valve made from brass.
Figure 7:
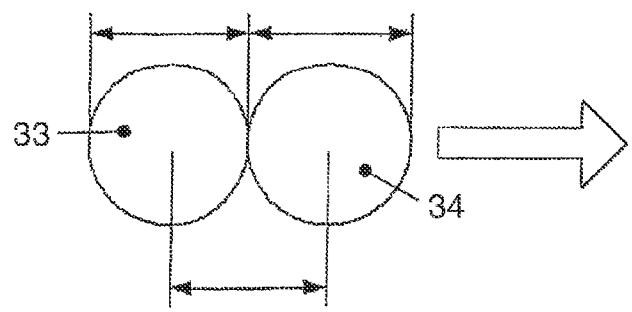

Referring to FIG. 6, a high energy density beam is produced by a Nd:YAG laser welding system 26 running in continuous mode (i.e. not pulsed mode) with a peak power output of 2 kW. Laser radiation is produced at a wavelength of 1.06 micron and is carried to the optical head 27 via silica optical fibres 28. The optical head focuses and splits the beam into two separate beams 29, 30 which are focused at a distance of 200 mm from the exit orifices 31, 32.

When the laser beam is focussed on the surface of the component assembly the diameters of the high-intensity spots 33, 34 produced are of the order of 0.6 mm. The two focussed spots produced by the optical head are arranged on the surface so that their centres are of the order of 0.6 mm apart, resulting in the pattern seen in FIG. 7. During welding, an elongated melt pool is formed with a length of around 1.2 mm and a width of around 0.6 mm.

The valve is welded by use of a double laser beam laser head. The optical head of the laser welding apparatus is positioned so that the laser beams are focussed on the surface 35 of the assembled parts. The orientation of the optical head is such that the two focal points lie at the same height, (i.e. the line joining their centres is horizontal) and so that at least some of the radiation will fall into the gap between the two parts of the component. The beams are directed so as to meet the surface of the assembled parts essentially perpendicularly, both in the vertical and horizontal planes.

A shielding gas is directed at the welding area by means of a supply pipe which is located behind the laser spot. The portion of the gap which is not welded thereby passes firstly under the laser beams and secondly under the shielding gas supply which is directed towards the laser beam focus points. The shielding gas is Argon which is supplied at a rate of 15-20 liters per minute. The shielding gas avoids the discolouration of the surface of the brass component during the welding procedure and helps in carrying away particulate matter produced during the welding procedure. Nitrogen or carbon dioxide gas may also be used as a shielding gas.

The welding process itself is carried out by rotating the assembled components around their common centre axis for the inner conduit at a rate which causes the surface on which the laser beams are focussed to move past the beams at a speed of 40 mm per second (or up to 80 mm per second).

The laser beam is turned on at full power (2 kW) and then reduced gradually over 100 ms to give 90% power (1.8 kW). The 90% power level is held whilst the assembled parts are rotated through one complete rotation past the focussed point of the laser beams. The 90% power level is maintained for a further 250 ms and then reduced gradually to 40% power over a period of 100 ms. The laser is then turned off.

The use of a slow reduction of power at the end of the welding sequence reduces the risk of cracks.

The use of 90% power for the majority of the welding sequence gives the correct depth of penetration of the weld.

The use of a double spot has been found to be an advantage in welding of brass.

FIG. 8 shows the valve component made from a first part 36 and a second part 37. The hatched zone 38 schematically indicates the appearance of the pool of melted material during the welding. During the welding process, the protrusions 39 will, however, be at least partly melted away. The surface 40 comprises a protrusion 41 which ensures the gap 42. During the welding, gases will drain into the reservoir 43 and the welding will therefore contain less pores and cracks caused by confined gas.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A method of making a valve from first and second tubular parts, wherein at least one of the parts is made from an alloy which contains metal with a boiling point which is in the range of, or lower than the melting point of the alloy, the parts being joined in a welding process wherein a laser beam is transmitted at least partly into a gap between first and second edges of the parts, and wherein vapours are conducted away from the component via the gap, the laser beam being focused to form a focus point having a size in the range of, or larger than a distance between the edges at an outer surface of the parts, wherein the first part is formed with a neck extending in a longitudinal direction from the first edge into a complementary socket which extends from the second edge into the second part whereby the position of the parts relative to each other is stabilised and the first and second edges are located adjacently at the distance and whereby the neck forms backing for the welding and thus prevents that molten material flows into an inner space of the tubular parts.

2. The method according to claim 1, wherein the laser beam is directed towards the gap at an angle of 0-20 degrees to at least one of the edges.

3. The method according to claim 1, wherein the laser beam is directed towards the gap at an angle of 70-90 degrees to an outer surface of the component.

4. The method according to claim 1, wherein the gap forms a weld zone with a top portion facing towards the laser source and a bottom portion facing in a substantially opposite direction, and wherein vapours resulting from the welding process defuse through a passage extending from the bottom portion and out of the gap.

5. The method according to claim 1, wherein a second laser beam is transmitted at least partly into the gap at a distance from the other laser beam.

6. The method according to claim 1, wherein the alloy is brass.

7. The method according to claim 1, wherein two laser beams are transmitted at least partly into the gap, at least one of the beams being in the size of or larger than the gap.

8. A valve made from a first tubular part with a first edge and a second tubular part with a second edge, at least one of the parts being made from an alloy which contains metal with a boiling point which is in the range of, or lower than the melting point of the alloy, and the parts being located relative to each other so that a gap is formed between the edges for joining the parts by laser welding, wherein the first part comprises a neck which is formed to be inserted in a longitudinal direction into a complementary socket in the second part whereby the edges are located adjacently, wherein movement of the neck in the socket is limited by limiting means to ensure a distance between the edges to form a gap which is suitable for the welding and the neck forms backing for the welding and thus prevents that molten material flows into an inner space of the tubular parts.

9. The valve according to claim 8, wherein the gap forms an opening in an outer surface of the component so that at least a part of a laser beam may be directed from outside the component and into the gap as part of the welding process.

10. The valve according to claim 8, wherein at least one of the parts is made from an alloy which contains metal with a boiling point which is in the range of, or lower than the melting point of the alloy and wherein the distance between the edges is dimensioned to allow the light to be transmitted into the gap.

11. The valve according to claim 10, wherein at least one of the parts is made from brass.

12. The valve according to claim 10, wherein the boiling point is lower than 99.5 pct of the melting point of the alloy.

13. The valve according to claim 10, wherein the distance between the edges is further dimensioned to allow vapours of the metal to defuse between the two parts.

14. The valve according to claim 8, wherein an outer surface of the neck abuts an inner surface of the socket.

15. The valve according to claim 14, wherein the abutting surfaces are circular in a cross-sectional view.

16. The valve according to claim 15, wherein the neck and socket are joined in a screw joint.

17. The valve according to claim 8, wherein the neck extends longer in the longitudinal direction than the socket whereby movement of the neck in the socket is limited by a top part of the neck abutting a bottom part of the socket.

18. The valve according to claim 8, wherein movement of the neck in the socket is limited by a first protrusion extending in the longitudinal direction from one of the parts towards the other part.

19. The valve according to claim 8, wherein the parts are tubular parts forming an inner cavity.

20. The valve according to claim 19, further comprising a passage extending from cavity towards the gap.

21. The valve according to claim 8, wherein at least one of the parts comprises a second protrusion extending circumferentially along the outer surface of the part and being provided to be melted at least partly during the welding process.

22. The valve according to claim 8, forming part of a valve for controlling a fluid flow.

23. A method of making a valve from first and second tubular parts wherein at least one of the parts is made from an alloy which contains metal with a boiling point which is in the range of, or lower than the melting point of the alloy, the parts being joined in a welding process wherein a laser beam is transmitted in a direction from a laser source and at least partly into a gap between first and second edges of the parts, wherein the first part is formed with a neck extending in a longitudinal direction from the first edge into a complementary socket which extends from the second edge into the second part whereby the first and second edges are located adjacently at a distance thereby forming the gap and whereby the neck forms backing for the welding and thus prevents that molten material flows into an inner space of the tubular parts.

* * * * *